United States Patent [19]

Moore

[11] Patent Number: 5,368,413
[45] Date of Patent: Nov. 29, 1994

[54] RELATING TO HANDLING OR LAYING PIPES

[76] Inventor: David Moore, 1 Laburnum House, High Street, Coleshill, Warks B46 1AZ, United Kingdom

[21] Appl. No.: 921,247

[22] Filed: Jul. 29, 1992

[51] Int. Cl.$^5$ .................................................. F16L 1/00
[52] U.S. Cl. ...................................... 405/154; 405/303
[58] Field of Search ............... 405/175, 184, 177, 174, 405/154, 145, 132, 146; 254/29 R, 234

[56] References Cited

U.S. PATENT DOCUMENTS

| 4,513,504 | 4/1985 | Nussbaumer et al. | 405/184 X |
| 4,594,027 | 6/1986 | Becker. | |
| 4,648,746 | 3/1987 | Abinett | 405/184 |
| 4,682,912 | 7/1987 | Henry | 405/154 |
| 4,741,646 | 5/1988 | Hatch | 405/175 |
| 4,984,289 | 1/1991 | Arakawa et al. | 405/184 |
| 5,048,793 | 9/1991 | Mefford et al. | 405/184 X |
| 5,061,120 | 10/1991 | Akesaka | 405/184 X |
| 5,069,426 | 12/1991 | Gabrysch | 405/184 X |

FOREIGN PATENT DOCUMENTS

| 179 | 1/1979 | European Pat. Off. . |
| 33940 | 8/1981 | European Pat. Off. . |
| 371024 | 4/1932 | United Kingdom . |
| 741176 | 11/1955 | United Kingdom . |
| 825298 | 12/1959 | United Kingdom . |
| 2158756 | 11/1985 | United Kingdom . |
| 2165788 | 4/1986 | United Kingdom . |

Primary Examiner—Dennis L. Taylor
Attorney, Agent, or Firm—Cushman, Darby & Cushman

[57] ABSTRACT

Pipe handling and laying apparatus 1 supports a pipe on holding and a support 2,3 and includes extendible and a retractable gripping member 4 having gripping head 4a. The pipe, supported generally within area A, is brought in end-to-end relationship with another pipe to be joined thereto. Gripper head 4a is introduced into the open end of the second pipe and ram piston P of hydraulic ram H is retracted causing legs L of gripper head 4 to pivot into extended positions to grip the interior wall of the second pipe by means of gripper feet F. Further retraction of ram piston P pulls the first pipe into close relationship with the second.

18 Claims, 8 Drawing Sheets

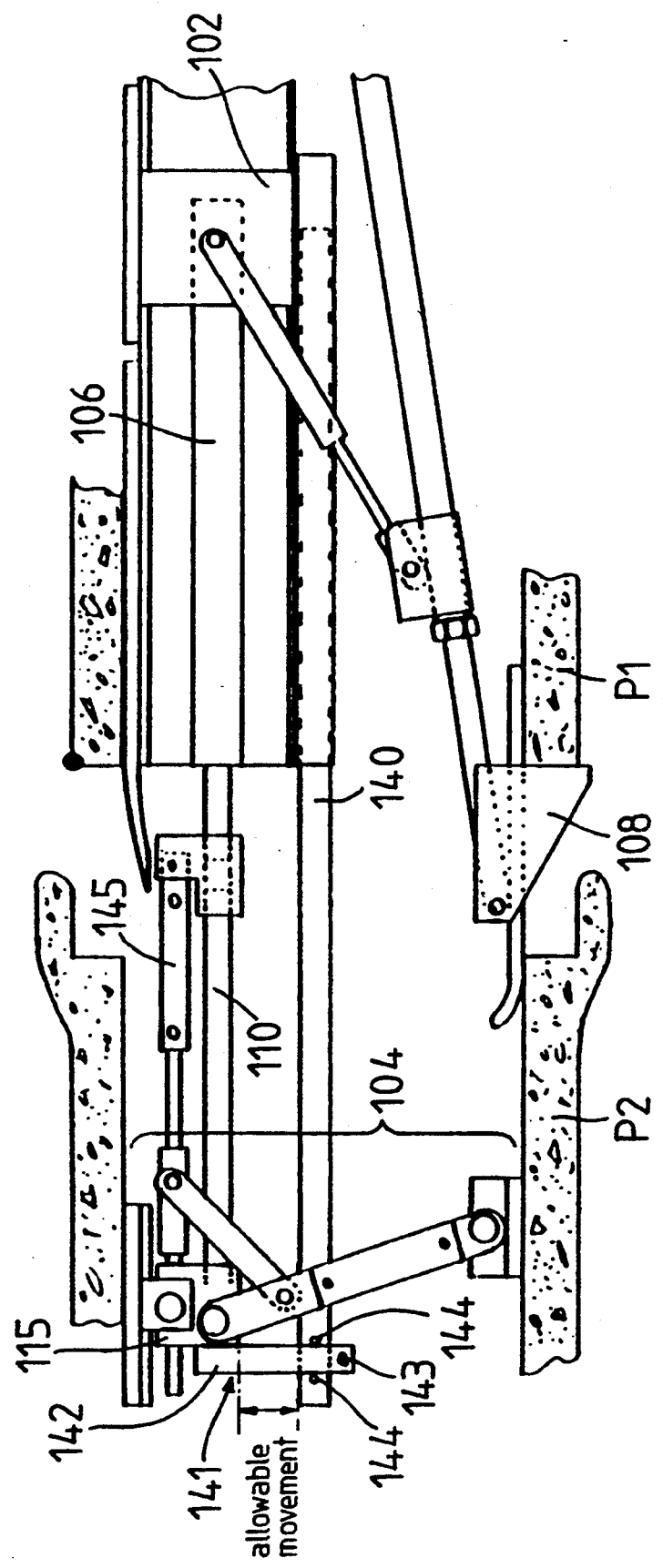

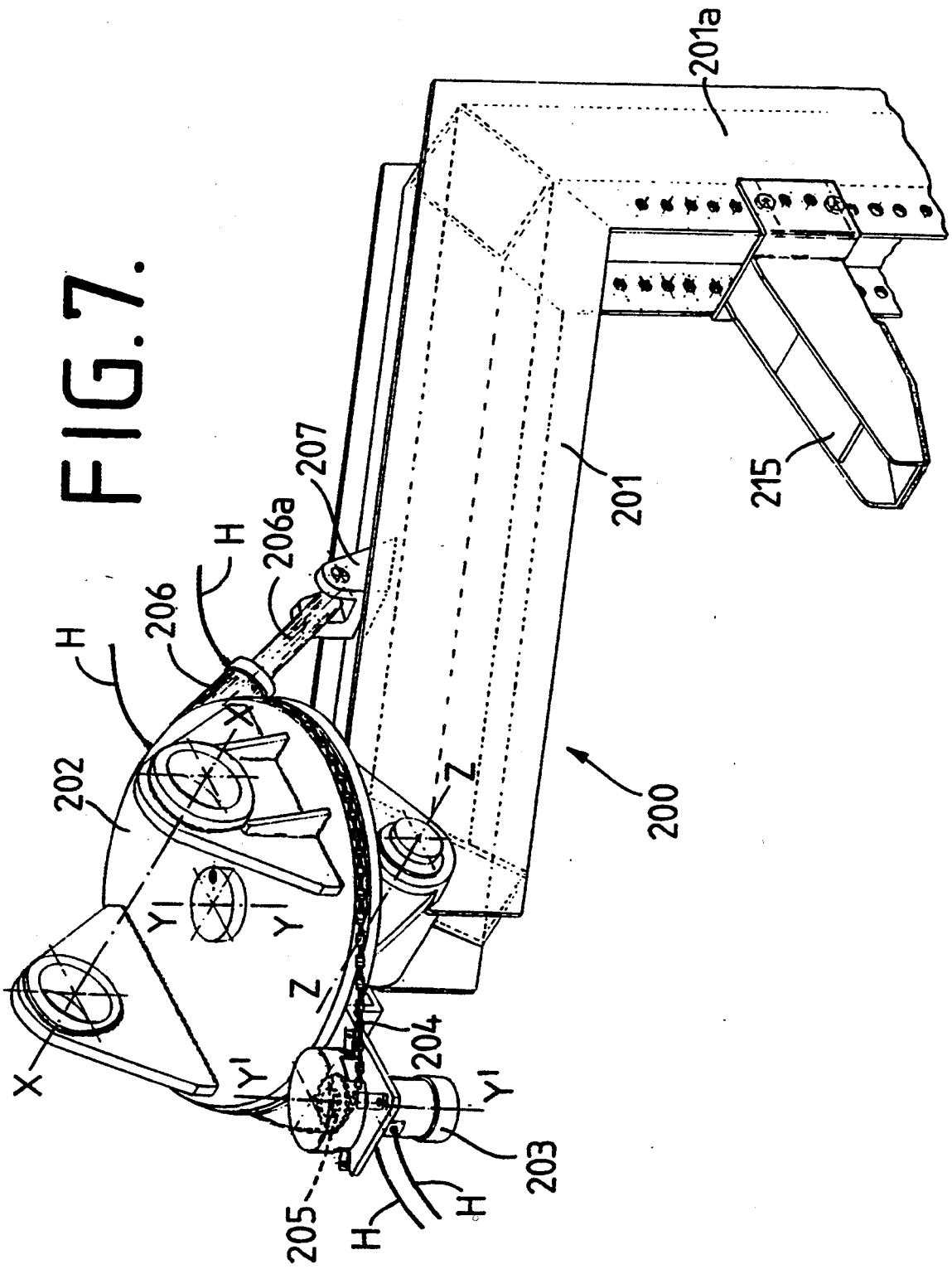

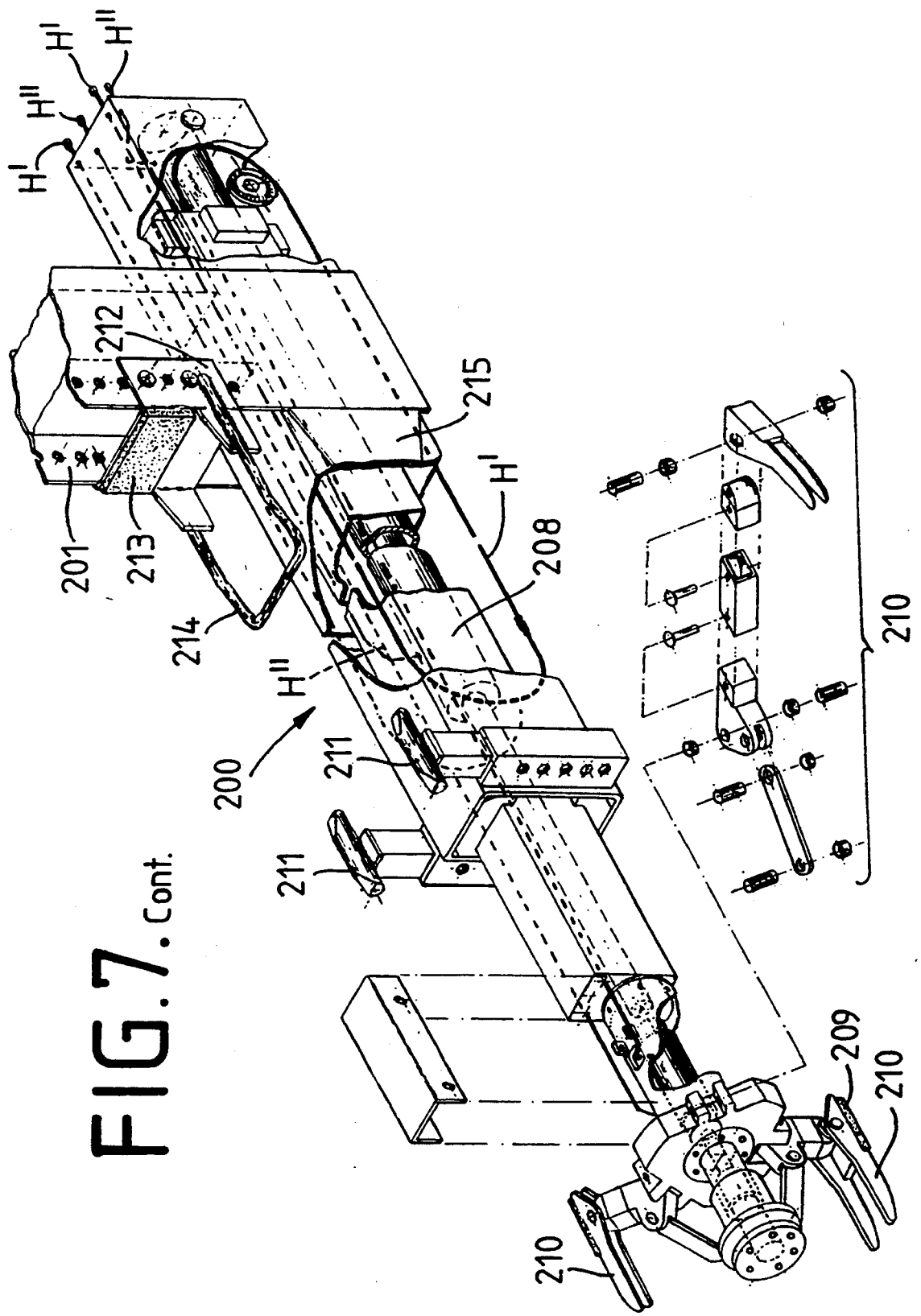

RELATING TO HANDLING OR LAYING PIPES

BACKGROUND OF THE INVENTION

This invention relates to improvements in or relating to handling or laying pipes and is more particularly but not exclusively concerned with apparatus and method for aligning and/or joining pipes in end to end relationship or simply in reliably handling or moving pipes from one place to another.

Handling and laying of pipes, more particularly large diameter (e.g. 2.4 m) concrete pipes (e.g. 2.5 m long) into the ground, tends to be a time consuming and laborious task. In order to maneuver one length of concrete piping in relation to another pipe already laid in the ground the first pipe may be lifted by mechanical grab(s) to be man-handled into an appropriately aligned end-to-end position with the fixed pipe, the grab(s) usually being supported on ropes or cables perhaps by hydraulic lifting apparatus. Once the first pipe is maneuvered into end to end relationship with the fixed pipe a difficulty then arises in securing the two pipes together. This may be accomplished by hydraulic pipe-pulling means arranged on the outside of the pipes. Such pipe-pulling equipment tends to be disadvantageous because trenches which accommodate the pipes have to be wider to accommodate the pipe pulling gear, the gear is applicable to a limited range of pipe diameters (400 to 750 mm diameter); tends to interfere with the shoring-up system, and is relatively heavy, cumbersome and costly. The heavy weight of pipe pulling equipment means that the weight of pipes which can be handled is less than might otherwise be the case. Clearly, the task of laying pipes or even in reliably and securely handling pipes (i.e. moving pipes from one place to another) tends to be awkward and monotonous but, nevertheless, forms an essential process in the construction industry.

It is an object of the present invention to provide apparatus and method to at least alleviate some of The aforementioned or other problems involved with the laying or handling of pipes, or to more easily and/or reliably handle and/or join pipes together.

SUMMARY OF THE INVENTION

According to a first aspect of the present invention there is provided pipe handling apparatus comprising pipe holding and supporting means to hold and support a first length of piping as it is lifted and introduced towards a second length of piping, and comprising extendible and retractable grip means connected to said pipe holding and supporting means and adapted in use to grip onto the interior of the second length of piping as the first pipe is moved into the correct alignment therewith.

By this aspect of the present invention the first length of piping which is held and supported by said apparatus can be brought into correct alignment with the second length of piping in a controlled manner and joined thereto by using the extendible and retractable grip means, usually virtually completely automatically.

Thus the pipe handling apparatus including said grip means may comprise a single (portable) unit.

Preferably, the apparatus is adapted for handling pipes of varying length and/or varying size of diameter or cross-section. Advantageously, said apparatus may be designed to handle pipes of a range of diameters from about 300 mm up to about 1200 mm.

Preferably the apparatus is self-aligning so that as the first pipe is moved or pulled towards the second it is automatically aligned therewith.

The grip means may be hydraulic or pneumatic in operation, and actuation of the grip means preferably moves the pipe lengths together.

Advantageously, therefore, the first length of piping may be lifted and introduced towards the second length of pipe and joined thereto in one operation, rather than lifting the first length into position and joining the pipes (moving or pulling the pipes towards one another into interlocking, sealing relationship) by a second operation, perhaps with the aid of additional, independently-operable pipe-pulling equipment.

In one embodiment of the present invention the grip means is in an extended state while said first pipe is introduced towards said second length and is retracted, to thereby expand the diametrical dimension of a gripper head thereof to grip the interior of the second pipe.

Preferably, the pipe-holding and supporting means of the apparatus comprises a lower support beam (locatable in use within the first length of piping) having an extendible leg or legs which hold onto the interior of the first length of piping during handling of the length. The apparatus may comprise an upper beam arranged generally parallel with the lower beam and the upper beam may include a block provided with adjustable connection points or eyes for locating cables of lifting apparatus (e.g. a hydraulically operated excavator) according to the length of pipe carried. The lower beam may house the extendible and retractable grip means which may comprise a hydraulic/pneumatic cylinder with ram piston extending generally axially or generally axially parallel to the beam (and first pipe when in use). A, or the, gripper head of the grip means may be located on the ram piston, the head preferably being arranged at a distance beyond the lower beam, at least when the grip means is in the extended state.

The gripper head may be provided with one or more retractable legs which extend (at least radially) to increase the diametrical extent of the gripper head as the grip means is retracted generally axially of the lower beam and first pipe, in use. Preferably, the gripper head legs are provided with hard rubber feet to grip securely onto the interior walling of the second length of piping to fix the position of the gripper head axially of the second length, so that continued retraction of the grip means causes the first length of piping to be pulled towards the second length.

Further advantageous features of the apparatus will be evident from the following description and drawings.

Further according to this first aspect of the present invention there is provided a method of laying a first length of piping and joining it to a second length of piping comprising:

holding and supporting the first length of piping while it is lifted and introduced towards the second length of piping by pipe handling apparatus including extendible and retractable grip means;

introducing the grip means into the second length of piping and actuating the grip means to grip onto the interior of the second length of piping, moving the first length of piping into correct relative alignment with the second length of piping, preferably, by further actuation of the extendible and retractable grip means.

Many other advantageous method features will be evident from the following description and drawings.

According to a second aspect of the present invention there is provided pipe handling apparatus comprising pipe holding and supporting means to hold and support a first length of piping as it is lifted and introduced towards a second length of piping, and comprising:

retaining means for securely locating a sealing ring relative to one end of the first length of piping as the length of piping is introduced towards a second length of piping, the retaining means acting to hold the sealing ring in place while the first length of piping is Joined to the second length of piping, and/or spring loaded safety catches which securely locate the first length of piping on said apparatus during handling, and/or a portable unit including grip means which is adapted to grip the interior of the second length of piping as the first length of piping is joined to the second length.

Advantageously, the weight of the apparatus in accordance with the present invention may be as little as 350 kg in comparison with weights of a ton for other pipe laying apparatus. The apparatus may also be produced at about one quarter of the cost.

Further according to the present invention there is provided a vehicle adapted for lifting, laying and joining pipes in end to end relationship, the vehicle having pipe handling apparatus comprising pipe holding and supporting means to hold and support a first length of piping as it is lifted and introduced towards a second length of piping, and comprising extendible and retractable grip means connected to the pipe holding and supporting means and adapted in use to grip on to the interior of the second length of piping as the first pipe is moved into correct alignment therewith.

Preferably, the pipe handling apparatus is provided with sensor means or camera means in order to relay information regarding the pipes being joined together to an operator in the driver's cab of the vehicle. Additionally, the pipe handling apparatus may provide an alignment guidance signal usually in the form of a laser beam directed along one of the pipes, which may be picked up by said sensor or camera means and relayed to an operator in the driver's cab.

Preferably the pipe handling apparatus can be controlled through a universal type motion by an indexing means and/or preferably the pipe handling apparatus is powered by the same power source as the control vehicle.

Still further according to the present invention there is provided a system for handling, laying and joining pipes, the system comprising a pipe holding and supporting means to hold and support a first length of piping as it is lifted and introduced towards a second length of piping the system including means to relay information regarding alignment of the two lengths of piping as they are joined together, to an operator remote from the pipework.

It is an advantage of apparatus in accordance with the present invention that a first pipe can be lifted by the pipe holding and supporting means from a location remote from a laid pipe to be joined thereto, the apparatus thus being utilized to carry said first pipe and the same apparatus being used to join the pipes together. Thus, pipes can be lifted, layed and joined together effectively all in one smooth continuous operation or process using the same apparatus. Additionally, it is desired that information regarding alignment of the pipes is conveyed to an operator remote from the pipework and preferably to an operator in the driver's cab of a vehicle fitted with the pipe handling apparatus. This avoids the need for further personnel close to the pipes being joined together continually assessing the alignment of the pipes while they are being joined together. In previous systems for joining pipes, lifting gear is required to lift the first pipe from a remote location to a laid pipe to be joined thereto, the first pipe is set down on the ground and a separate hand-operated pipe puller might be introduced into the first pipe and used to drag same into joining relationship with the laid pipe adjacent thereto.

Thus, it will be appreciated that apparatus in accordance with the present invention may offer dramatic improvements over such known apparatus and should dramatically ease the performance of such operations which may be performed within a vastly reduced time period and require less personnel.

BRIEF DESCRIPTION OF THE DRAWINGS

Two embodiments of apparatus for handling and laying pipes and method of handling and laying pipes accordance with the present invention will now be described, by way of example only, with reference to the much simplified diagrammatic drawings, not drawn to scale, in which:

FIG. 6 shows a view similar to FIG. 3 of the apparatus incorporating further modifications; and FIG. 7 is a partially cut-away perspective view of another embodiment of the invention.

DETAILED DESCRIPTION OF THE PRESENTLY PREFERRED EXEMPLARY EMBODIMENT

Figure 1:
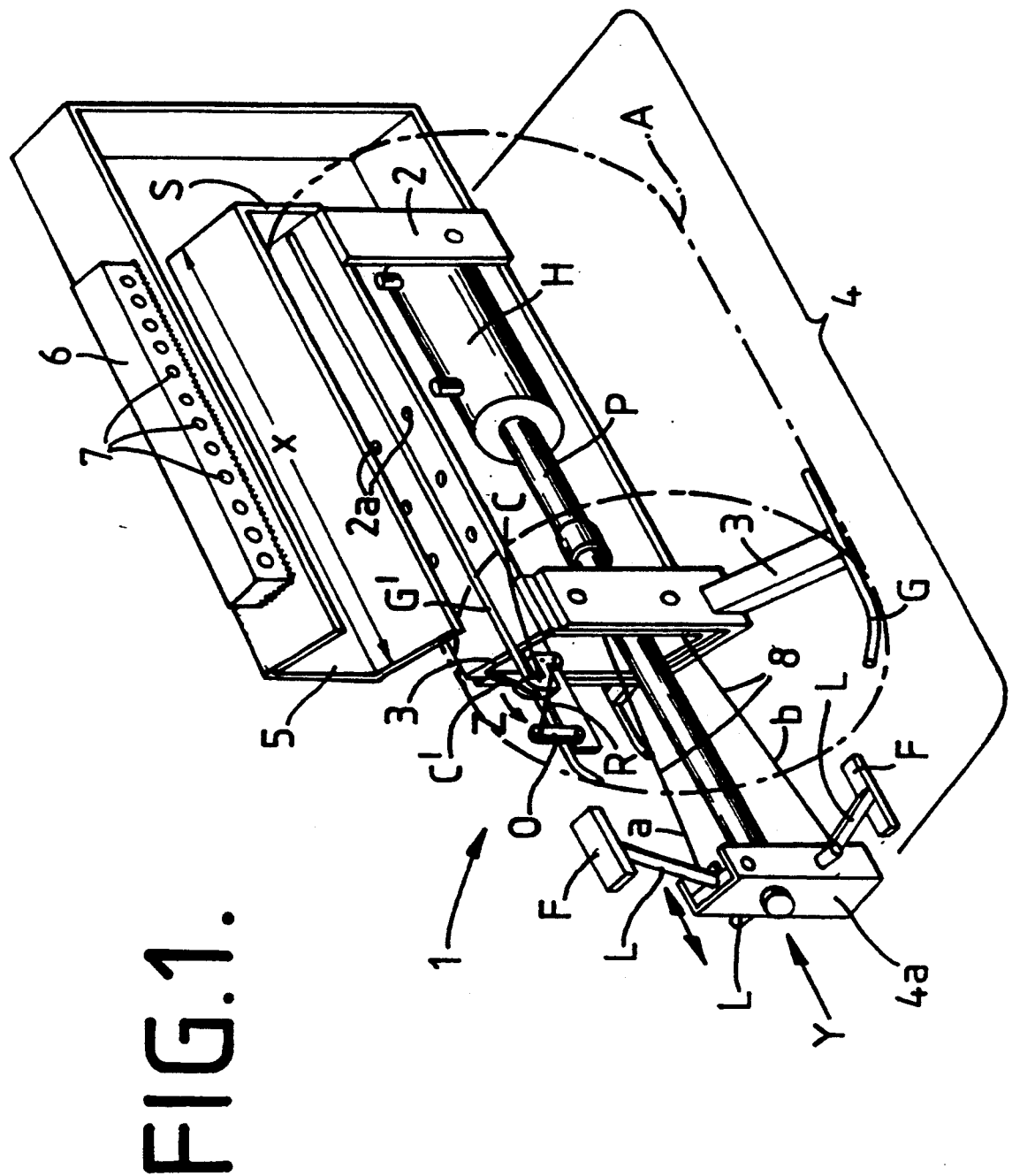
FIG. 1 shows a pictorial representation of the first embodiment of said apparatus.

FIG. 1 of the drawings shows a pipe handling and laying apparatus 1 which, in use, will be suspended by cables from a hydraulic excavator (not shown). Distance X as marked in the drawing will be about 2.5 meters, in practice, and, in use, a first length of piping which is to be handled or moved from one place to another will be held and supported on the holding and support means 2 and 3 of the apparatus 1. A pipe (not shown) may be located on the holding and support means 2,3 by the introduction of said pipe means in the direction of arrow Y over gripping head 4a of extendible and retractable gripping means 4. Thus the gripping head 4a is firstly arranged within the pipe with the hydraulic ram H of the extendible and retractable gripper means extending substantially axially of the pipe. The pipe will then be brought generally into the area A defined by the chain dotted lines in FIG. 1, beyond the gripper head 4a.

As shown in FIG. 1 the gripper head 4a is in its fully extended position with its three legs L fully retracted such that they will be well within the diameter of the pipe carried by the apparatus 1 to enable the pipe to be introduced onto the holding and support means 2,3. In order to lay the pipe in correct alignment in end to end relationship with a second pipe (not shown) the first pipe, when correctly located on the apparatus 1, is lifted and carried into position and the gripper head 4a introduced into the open end of the second pipe. The ram piston P of the hydraulic ram H is then retracted causing the legs L of the gripper head 4 to pivot into extended positions (increasing the diametrical extent of the gripper head) to thereby grip the interior wall of the second pipe by means of the gripper feet F at the ends of the legs L. This fixes the position of the gripper head 4a relative to the second pipe so that any further retraction of the ram piston P necessarily pulls or draws the lower beam 2 of the holding and support means 2,3, and thus the first pipe, generally axially towards the second pipe and into close relationship therewith. The ram piston P can now be extended again in order to move the gripper head 4a axially further into the second pipe thereby retracting the legs L and releasing the grip of the gripper feet F on the inside of the second pipe. In this position the whole apparatus 1 can be withdrawn from the first and second pipe leaving the first pipe laid in correct relationship to the second.

The apparatus 1 is adapted to hold and support pipes of varying length and diameter. In this instance the apparatus can be used to handle and join concrete pipes of diameters from 37.5 cm up to 120 cm and varying lengths from 2.5 meters down to 0.5 meters. The upper limit on the diameter of pipe which can be handled by the apparatus will be determined by the safe working load and the design of the apparatus may be varied to suit. The holding and support means 2,3 includes two adjustable lower legs 3 so that varying diameter of pipes can be catered for by adjusting the length of these legs 3. The two legs 3 may be made adjustable by any suitable means and could be adjustable together or independently and, for example, they could be telescopic.

The apparatus 1 comprises an upper beam 5 on top of which is mounted a block 6 having adjustable lifting points or eyes 7 to cater for pipes of different lengths carried by the apparatus (in order to balance the load through the centre of gravity). The lower beam 2 is provided with a number (6 as shown) of holes 2a for receiving a stop (not shown) in use, so that a pipe can be located on the locating support means 2,3 with the back or upper edge of the pipe resting against said stop located in one of the pair of locating holes 2a (or against the vertical rear stop wall S depending upon the length of the pipe) with three spring loaded safety catches C (only one safety catch shown in FIG. 1) overlapping the front edge of said pipe. Advantageously, the safety catches C will be located generally equiangularly around the pipe firmly securing the pipe onto the apparatus 1. Each of the two lower, adjustable, legs 3 is attached to an inwardly curved guide rail G which is in firm contact with the inner wall of the pipe. The pipe will also be seated on an upper guide rail G' resting on the interior of the pipe. This upper guide rail G' runs centrally parallel to the upper portion of the beam 2 in which the holes 2a are located, along an upper one of the legs 3 which is, in this example non-adjustable, and guide rail G' then curves radially inwardly as shown in the FIG. 1. Thus the pipe can be securely held and supported on the apparatus in the aforedescribed manner with the safety locking catches C operative. In itself, this method of holding and supporting a pipe for movement by, for example, a hydraulic excavator may be a more reliable and secure method than previous methods more because of the provision of the safety locking catches.

Advantageously, a sealing ring (not shown) can also be held by the apparatus on the front end of the pipe by spring steel strips C' (only one shown in FIG. 1) on the safety catches C in a manner which it is believed to be self-evident. In this way the pipe with the rubber sealing ring already positioned in front thereof can be introduced successfully to a second pipe and joined thereto with seemingly the minimum amount of fuss. The safety catches C are each provided with pivotable operating arms O attached to their associated catches C by operating rods or wires R.

With the pipe in secure location on the lower beam 2 and the sealing ring located in place by the curved spring steel strips C' on the catches C, the apparatus can be lifted by a hydraulic excavator with the upper beam being suspended therefrom at connector point(s) 7 on the block 6. The apparatus 1 and pipe and sealing ring can now be swung and lowered into position immediately in front of (in end to end relationship) a second pipe already laid in the ground. The pipe and sealing ring can be moved forwards by the excavator until the gripping head 4a (in its extended state with its three legs L retracted) is introduced inside the second pipe. The second, previously laid pipe, will be surrounded by bedding material and, therefore, unable to move so that a firm anchor point can be created when the ram piston 3 is retracted. The gripping head 4a will be inserted into said second pipe until the curved portions of the guide rails G,G' are about to make contact with the second pipe and at this point the ram piston P is retracted. Retraction of the ram piston releases tension on two steel cables 8 (which cables attach the three legs L of the gripper head to the ram piston P), thereby allowing the legs L to expand outwardly and contact the inner wall of the second pipe. One cable a is attached to the upper leg L and another cable b controls the pair of lower legs in unison. In the example shown, the lower two gripping legs L are of variable length (they may be telescopic) and as should be apparent all three legs L are spring loaded to return to the position as shown in FIG. 1. The feet F would usually have a hard rubber outer face to provide a secure grip on the interior walling of the pipe. Further retraction of the ram piston P pulls or draws the front end of the first pipe and the rubber sealing ring towards the open end of the laid pipe, with the gripper head 4a providing a firm anchor point on the second pipe. As the first pipe is drawn generally axially towards the second (said guide rails G,G' helping to maintain good alignment) the outer edge or rim of the second pipe contacts the operating arms O thereby pivoting them inwardly and rearwardly to operate rods or wires R to swing the safety catches C inwardly and forwardly (as represented by arrow Z in the FIGURE) to release their hold on the sealing ring just as the edge of the second pipe is about to make contact therewith. Thus, the first pipe is drawn into the correct relative alignment with the second, laid pipe with the sealing ring sealing the joint therebetween. The two pipes can be firmly drawn together and sealed by the sealing ring in this manner. The ram piston may then be extended again in order to retract the legs L and push the gripper head 4A further into the second pipe. Once the steel cables a,b have moved the legs L into the fully closed up or retracted position the whole apparatus can then be withdrawn from the two pipes with the hydraulic ram H and beam 2 being drawn axially out of the jointed pipe arrangement. The hydraulic ram H may be a two and a half inch cylinder with a three foot stroke (63 mm cylinder, 900 mm stroke and the guide rails G,G' may be made from 50 mm round bar). Advantageously the hydraulic ram H may be powered from the hydraulic excavator itself and the controls for the ram may also be located on the excavator and/or on the apparatus 1 itself.

Figure 2:
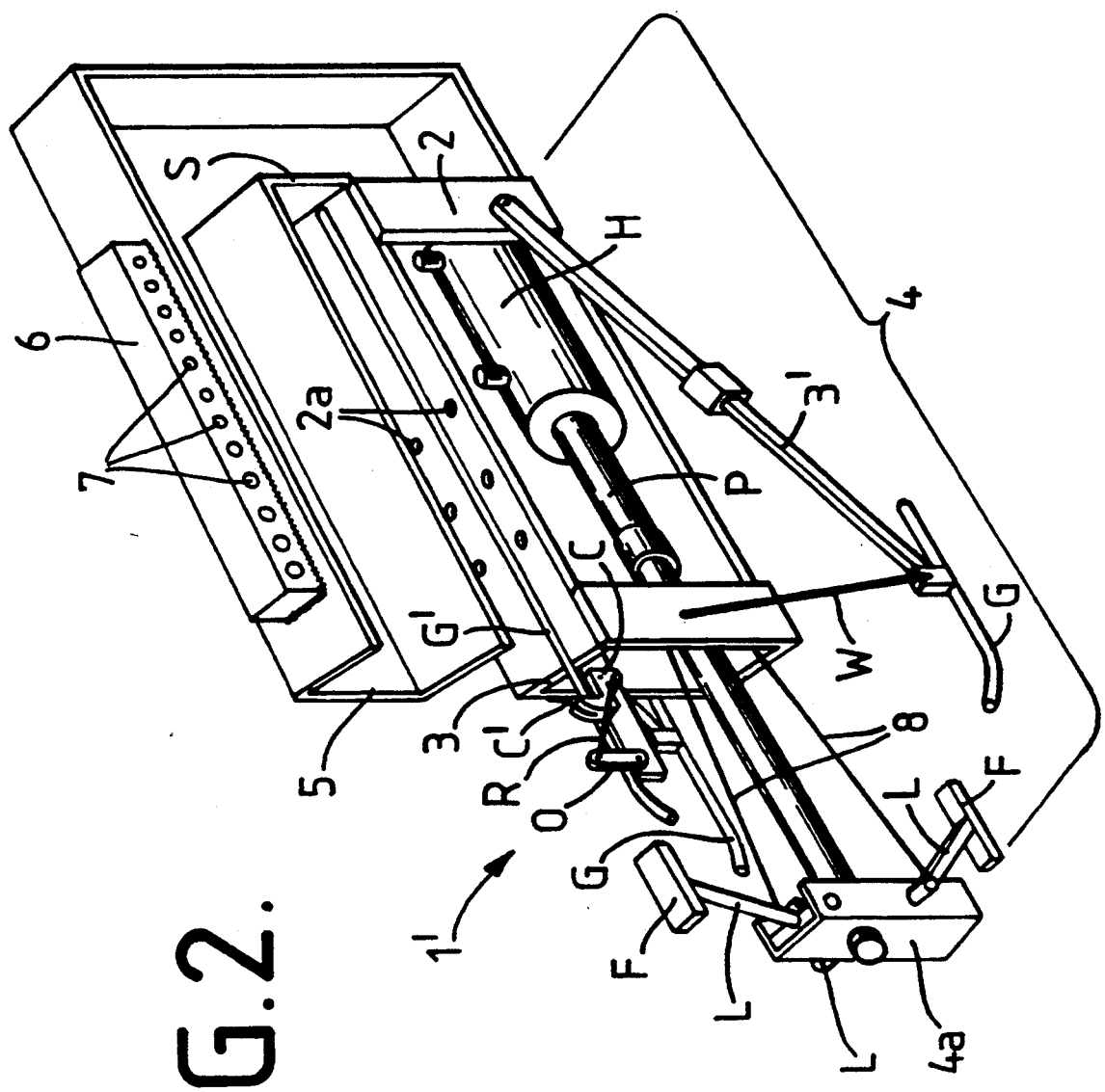
FIG. 2 shows a similar pictorial representation of the second embodiment.

FIG. 2 shows a second embodiment of the apparatus 1' in which legs 3 are now replaced by larger telescopic inclined legs 3', connected to the rear of beam 2. Legs 3' are connected to the beam 2 at the front end thereof by retaining wires W as shown (only one wire is shown). Legs 3' are spring loaded downwards against the retaining wires W, which are also of adjustable length. The remainder of the apparatus is in accordance with that already described in relation to FIG. 1 of the apparatus.

The Applicant has developed a production version of apparatus for laying pipes and this version will now be described by way of example only with reference to FIGS. 3—6.

Figure 3:
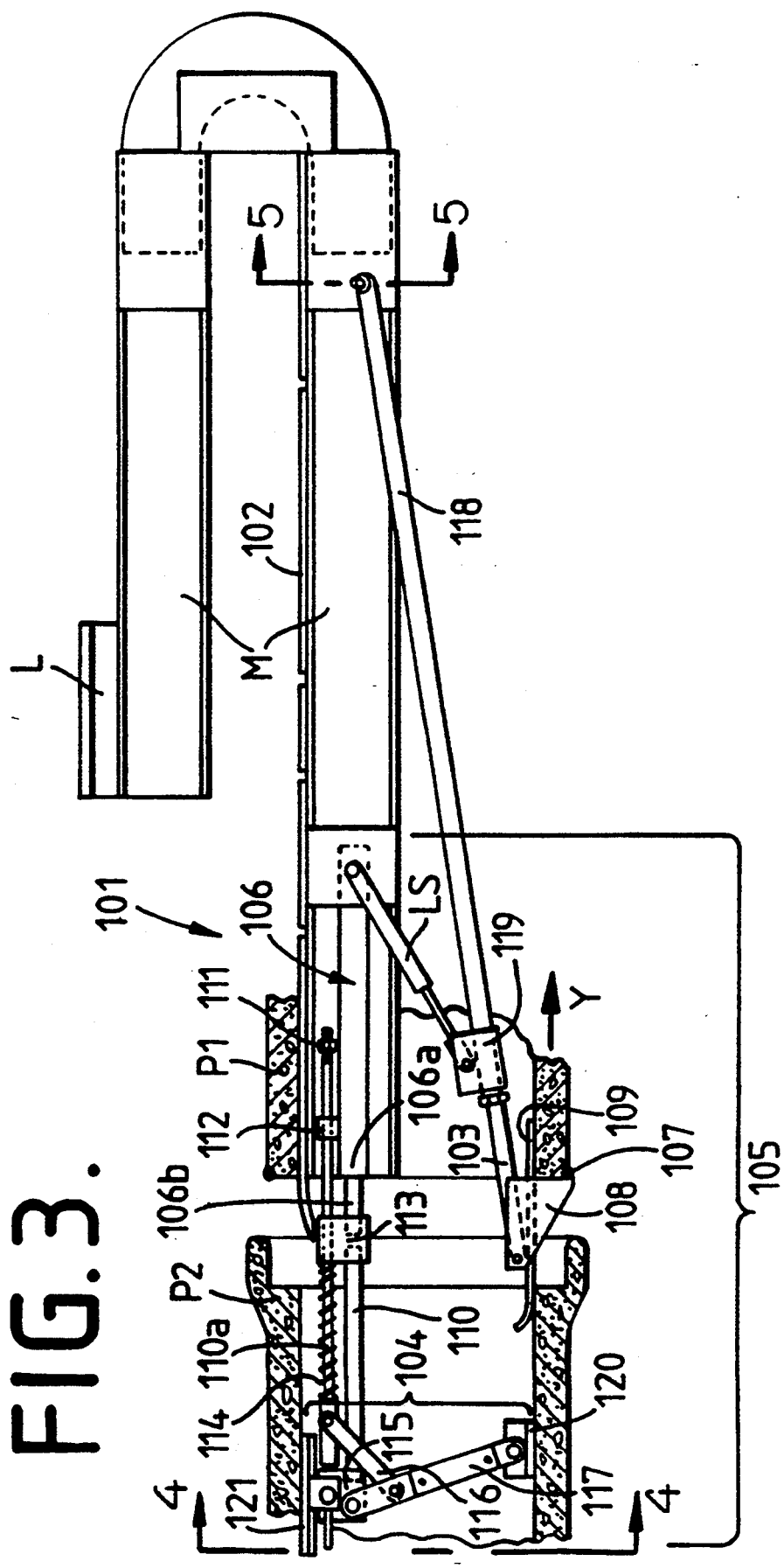
FIG. 3 shows a longitudinal sectional view of the production version of the apparatus.
Figure 4:
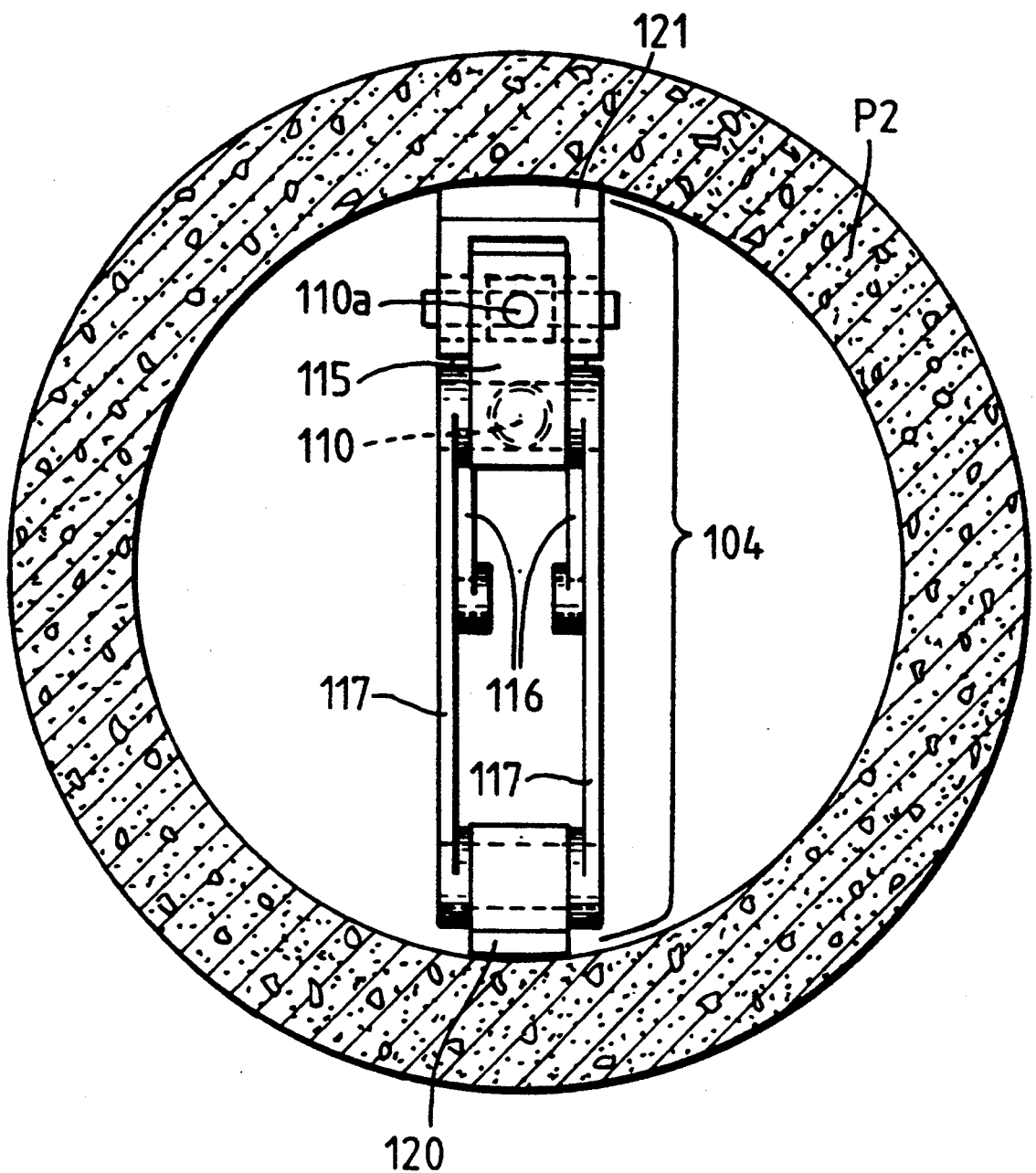
FIGS. 4 and 5 show sectional views taken on lines 4—4 and 5—5 of FIG. 3 and drawn on an enlarged scale.
Figure 5:
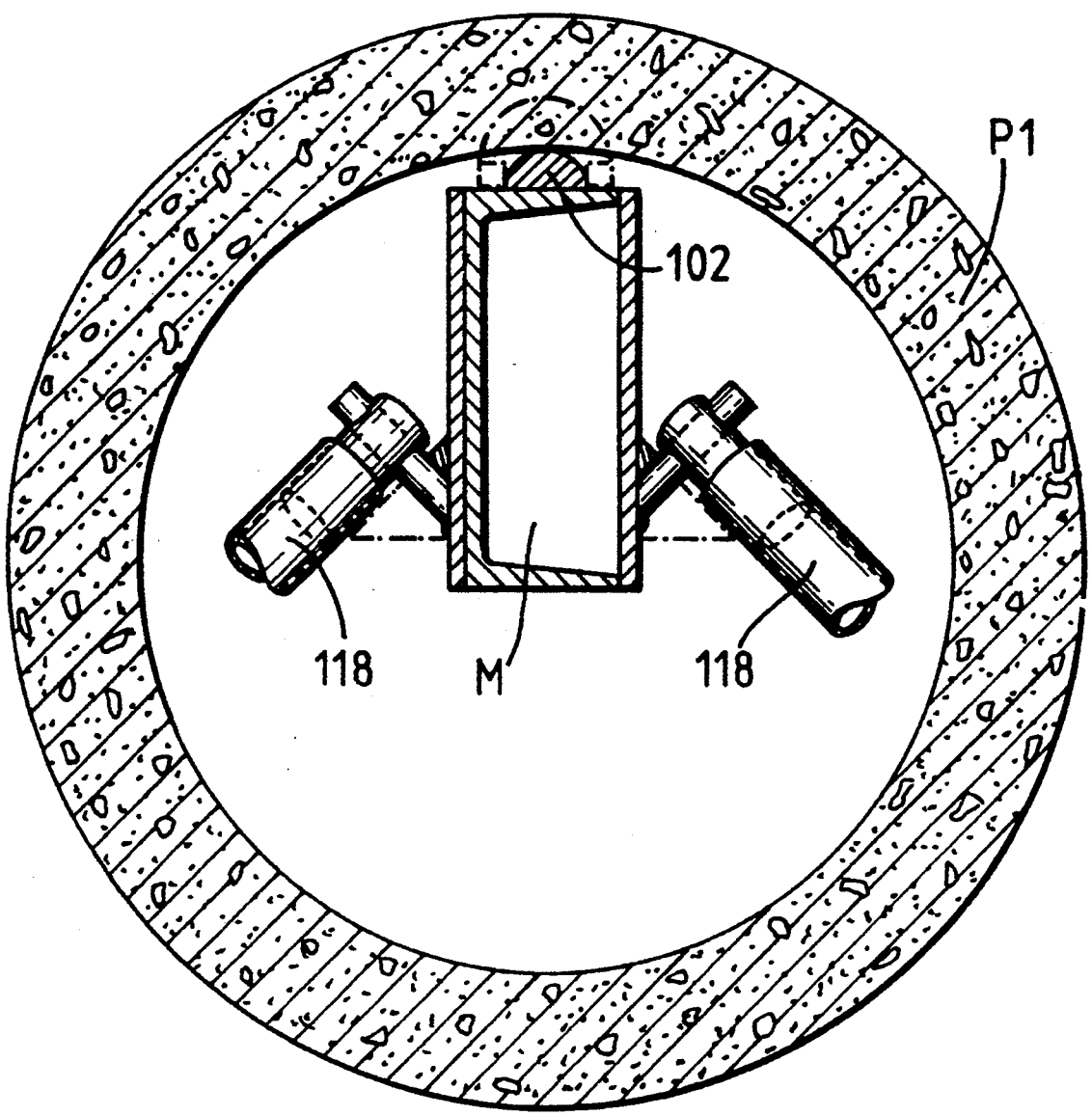

FIG. 3 shows a production version of pipe handling and laying apparatus 101 which, in use, will be suspended by cables from a hydraulic excavator (not shown). The cables will be connected by eyes (not shown in lifting block L. A section of a first pipe P1 is shown located on holding and support means 102,103 said pipe being introduced onto the holding and support means in the direction of arrow Y over the gripping head 104 of extendible and retractable gripping means 105. The retractable and extendible gripping means 105 includes a hydraulic ram 106 extending parallel to the axis of pipe P1. In this embodiment, a sealing ring 107 is shown on the front end of the pipe P1 and is retained onto said front end by safety catches 108 (only one shown), in a manner which should be generally self-evident. In this way, the pipe P1 with rubber sealing ring 107 already positioned in front thereof can be introduced successfully to the second pipe P2 and joined thereto. The hydraulic ram 106 is fully extended before introduction of the gripper head 104 into the pipe P2. When the hydraulic ram 106 is fully extended upper and lower actuating rods 110,110a are moved outwardly to the left from the position as shown in FIG. 3 until the nut 111 (threaded onto the righthand end of the upper actuating rod 110a) engages guide block 112 fixed to the top of the cylinder 106a of the hydraulic ram 106. Further outward movement of the hydraulic ram piston 106b allows connector block 113 to slide along the upper actuating rod 110a against spring biasing provided by spring 114 in a manner which should be generally self-evident, with further movement of the upper actuating rod to the left being prevented by the engagement of the nut 111 with guide block 112. Thus, the upper actuating rod remains stationary as the lower actuating rod 110 moves with the connector block 113 and a head block 115 of the gripper head 104 slides on the upper actuating rod. This relative movement causes links 116 (see also FIG. 4) to pull on the two opposed legs 117 (to which the links 116 are articulated respectively), thereby causing the legs 117 to close up into a retracked position. The length of the legs 117 is adjustable.

The gripper head 104 is now introduced into the open end of pipe P2 until the guide rails 109 locate into the pipe P2. In FIG. 3, the retaining wires W of FIG. 2 have been replaced by spring-loaded leg stays LS which are pivotally connected to inclined legs 118 in the manner shown by way of respective leg clamps 119, adjustment of the length of the lower legs 118 and leg clamps 119 allows the guide rails 109 and safety catches 108 to be brought to bear on the open end of the pipe P2. It is advantageous that the adjustment operation, once completed for a particular nominal pipe diameter, need not be repeated until another different nominal diameter pipe is to be handled. The pipe-laying apparatus 101 with the pipe P1 is positioned immediately in front of the pipe P2 with the rubber sealing ring 107 being retained in position by way of the safety catches 108 and maneuvered until the gripper head 104 is inside the pipe P2. The hydraulic ram 106 can now be operated to its retracted position i.e. piston 106b can now be retracted further within the cylinder 106a causing the spring 114 to push on the links 116 and force the adjustable length legs 117 radially outwards to cause gripper pads 120 and 121 (located at end of the legs 117 and on the head block 115) into contact with the inside wall of the pipe P2. Further retraction of the hydraulic ram 106 increases the grip on the inside wall of the pipe P2 and pulls the pipe P1 axially towards the pipe P2. The guide rails 109 ensure accurate alignment of the pipes P1 and P2 and the safety catches 108 bear on the pipe P2 moving the lower legs 118 up against the spring loaded leg stays LS and the pipe is securely joined to the pipe P2 in sealed manner. The hydraulic ram 106 is then operated to a fully extended position in which the gripper pads 120 and 121 are moved radially inwardly to release the grip on the inside wall of the pipe P2 to allow the pipe handling apparatus 101 to be withdrawn axially from the pipe P1 in a direction to the right as shown in FIG. 3. The piston 106b is threadably connected to the connector block 113 and the guide block 112 is welded to the top of the cylinder 106a. A petrol or diesel self-contained power pack and control valves with pressure regulating valve and pressure gauge (not shown) is to be mounted on the main lifting beam M (comprising an upper and lower beam) and it is envisaged that the maximum operating pressure will be about 3,000 p.s.i.

FIG. 6 shows a view similar to FIG. 3 of the production version of the apparatus 101 but incorporating two further modifications. The first modification allows additional support to be given to the gripping head 104 by way of additional support means in the form of a solid rectangular section steel bar 140 slidably received in a square tube welded to the underside of the holding means (lower support beam) 102. A carriage 141 is provided consisting of two plates 142 (only one shown) and a roller 143, and the carriage is welded to the head block 115. The steel bar 140 passes through the carriage 141 and is held in place by two retaining pins 144 as shown in operation, the head block 115 is free to move up and down vertically (allowable movement shown on the FIGURE) to allow gripping of the pipe P2 even where the pipes P1 and P2 are not in perfect alignment, such movement being limited by the lower roller 143 in an upwards direction and by the head block itself in a downwards direction. The head block assembly is restrained from rotating relative to the support means 102 ensuring the correct positioning of the gripping head within the pipe P3.

The second modification is the replacement of actuating rod 110A and spring 114 by a hydraulic ram 145. In some situations it may be advantageous to be able to close up the gripping head 104 when a main hydraulic ram 106 is in a retracted position, for example in areas limited operating space, as this allows for easier positioning of the gripping head 104 inside the pipe. Replacement of the actuating rod and spring with the hydraulic ram allows the gripper head 104 to be operated independently of the position of the head block (whether fully extended or retracted). It is envisioned that both the arrangements shown in FIG. 3 and in FIG. 6 may be utilized depending upon varying conditions.

The Applicant has made some further major developments in apparatus and method for handling and laying pipes in accordance with the present invention which will now be described, by way of example only, with reference to FIG. 7 of the accompanying drawings which shows a simplified partially cut-away perspective view of said apparatus.

FIG. 7 shows pipe handling and laying apparatus 200 which functions generally similarly to previously described embodiments. However, the apparatus 200 is no longer suspended by cables from a hydraulic excavator vehicle (not shown). Instead, the apparatus 200 has an angled pivoting arm 201, the pivoting movement of which is controlled by an indexing head 202 driven by an indexing motor 203 controlled by a joystick control (not shown) located in the driver's cab of an excavator vehicle (not shown). The indexing head 202 has been located in the position on the excavator at which an excavator bucket is usually located. The bucket would normally be arranged to pivot about axis X—X shown on the indexing head 202. As shown in FIG. 7, indexing head 202 is a circular platform driven by chain 204 about vertical axis Y—Y by way of an indexing sprocket 205 offset to one side of the platform 202 and in meshing engagement with the chain 204. Sprocket 205 is driven about a vertical axis Y'—Y' by the indexing motor 203. In addition to the arm 201 being pivoted about axis Y—Y, one end of the arm 201 is connected to the underside of the indexing head and arranged to pivot about horizontal axis Z—Z, upon actuation of hydraulic piston and cylinder means 206 which is in the form of a tilt control. Thus the arm 201 may be subjected to a universal type indexing movement. As shown the piston 206A is pivotally connected at one end to a pivoting mounting location 207 fixed on the top of the beam 201. It is envisaged that the hydraulic power source used to power the excavator will be the same source as that used for powering the arm 201 and hydraulic ram 208 controlling the gripper head 209. Hydraulic feed pipe connections are denoted at H, gripper cylinder hydraulic feed pipe connections are denoted at H' and main ram hydraulic feed pipe connections are noted at H". For ease of illustration one of the gripper head legs 210 of the advantageous self centering gripper head is shown in exploded form and the apparatus 200 is provided with vertically adjustable support legs 211 which can be used to support a pipe whilst carried on the apparatus 200. A further vertically adjustable bracket 212 carrying rubber end pad or stop 213 is provided on the lower end of the vertical portion 201A of arm 201 (and carries U-shaped support member 214) and is arranged below vertically adjustable bracket member 215 which limits the upper movement of the pipe. Support legs 211 and bracket 212 ensure that the pipe seats centrally on the lower support beam 215.

Additionally, it is envisioned that close-circuit television cameras or sensor means will be provided on either side of the arm 201. One of the cameras will be trained on the gripper head so that the operator inside the cab will be able to monitor progress of the pipe laying operation and the other camera will be trained on a laser sighting line or the like in order to assist in guidance when joining pipes together. Thus, information regarding alignment of the pipes being joined can be relayed to a location remote from the pipes e.g. to an operation in a driver's cab of an excavator vehicle.

Therefore, further according to the present invention there is provided pipe handling apparatus comprising pipe holding and supporting means to hold and support a first length of piping as it is lifted into use towards the second length of piping, and comprising one or more of the following features.

(1) Indexing means to pivot the pipe holding and supporting means, preferably about two transverse axes;

(2) An angled pivoting beam which is hydraulically actuated via control means in a driver's cab of an excavator vehicle;

(3) Camera means arranged to convey pictures of various parts of the apparatus in relation to pipe work during the pipe handling apparatus to an operator and/or to pick up on a guidance or alignment laser beam or the like to assist in laying of the pipework, said pictures preferably being relayed to an operator inside a driver's cab of the excavator vehicle;

(4) The pipe holding and support apparatus being powered from the same hydraulic power source as an excavator vehicle fitted with said apparatus;

(5) Any advantageous feature that may be gleamed from FIG. 6 or FIG. 7 of this application in particular relating to adjustment of pipe support means, hydraulic power supply or gripper head or motor driven indexing means.

It is to be understood that the scope of the present invention is not to be unduly limited to the particular choice of terminology and that a specific term may be replaced by any equivalent or generic term where sensible. Further it is to be understood that individual features, methods, uses or functions related to the pipe handling apparatus might be individually patentably inventive. The singular may include the plural where sensible and vice versa. Additionally, any range mentioned herein for any variable or parameter shall be taken to include a disclosure of any derivable sub-range within that range or of any particular value of the variable or parameter arranged within, or at an end of, the range or sub-range.

I claim:

1. Pipe handling and laying apparatus comprising:
   pipe holding and supporting means for holding and supporting a first length of piping as said first length of piping is lifted from a location remote from a previously laid length of piping and introduced toward said second length of piping and joined thereto, and axial extendible and retractable grip means connected to said pipe holding and supporting means for gripping an interior of the second length of piping as the first length of piping is moved into alignment therewith and joined thereto.

2. Apparatus as claimed in claim 1 comprising a single unit.

3. Apparatus as claimed in claim 1 which is adapted for handling pipes of varying length and varying size of cross-section.

4. Apparatus as claimed in claim 1 which is self-aligning so that as the first length of piping is moved toward the second length of piping, the first length of piping is automatically aligned therewith.

5. Apparatus as claimed in claim 1 in which the grip means is hydraulic in operation, and in which actuation of the grip means moves the piping lengths together.

6. Pipe handling and laying apparatus comprising:
pipe holding and supporting means for holding and supporting a first length of piping as said first length of piping is lifted from a location remote from a previously laid length of piping and introduced toward said second length of piping, and
extendible and retractable grip means connected to said pipe holding and supporting means for gripping an interior of the second length of piping as the first length of piping is moved into alignment therewith, said grip means being in an extended state while said first length of piping is introduced toward said second length of piping and is retracted, to thereby expand a diametrical dimension of a gripper head thereof to grip the interior of the second length of piping.

7. Apparatus as claimed in claim 6, in which the extendible and retractable grip means comprises a hydraulic cylinder with a ram piston extending generally axially parallel to a lower beam.

8. Apparatus as claims in claim 1 in which the pipe-holding and supporting means of the apparatus comprises a lower support beam having at least one extendible leg which hold onto the interior of the first length of piping during handling of said first length of piping.

9. Apparatus as claimed in claim 1 in which the extendible and retractable grip means comprises a hydraulic cylinder with a ram piston extending generally axially parallel to a lower beam.

10. A method of laying a first length of piping and joining said first length of piping to a second length of piping comprising the steps of:
lifting the first length of piping from a location remote from the second length of piping which has been laid;
holding and supporting the first length of piping while said first length of piping is lifted from said remote location and introduced toward said second length of piping and joined thereto by a pipe handling apparatus including axial extendible and retractable grip means;
axially introducing said grip means into the second length of piping and actuating said grip means to grip onto an interior of said second length of piping;
moving the first length of piping into correct relative alignment with said second length of piping; and
joining said second length of piping to said first length of piping.

11. A method as claimed in claim 10 in which said pipe handling apparatus is self-aligning so that as the first pipe is moved toward the second length of piping is automatically aligned therewith.

12. A method as claimed in claim 10 in which the grip means operates hydraulically.

13. A method of laying a first length of piping and joining said first length of piping to a second length of piping comprising the steps of:
holding and supporting the first length of piping while said first length of piping is lifted from a remote introduced toward said second length of piping by a apparatus including extendible and retractable grip means;
introducing said grip means into the second length of piping and actuating said grip means to grip onto an interior of said second length of piping; and
moving the first length of piping into correct relative alignment with said second length of piping,
said grip means being in an extended state while said first length of piping is introduced toward said second length of piping and is retracted, to thereby expand a diametrical dimension of a gripper head thereof to grip the interior of the second length of piping.

14. A method as claimed in claim 10 in which the pipe-holding and supporting means of the apparatus comprises a lower support beam.

15. Pipe handling apparatus comprising:
pipe holding and supporting means for holding and supporting a first length of piping as said first length of piping is lifted and introduced toward a second length of piping,
retaining means for securely locating a sealing ring relative to one end of said first length of piping as said first length of piping is introduced toward said second length of piping, said retaining means holding the sealing ring in place while the first length of piping is joined to said second length of piping,
spring loaded safety catches which securely locate the first length of piping on said apparatus during handling, and
a portable unit adapted to be attached to an excavator and including axial extendable and retractable grip means for gripping an interior of the second length of piping as the first length of piping is joined to said second length of piping.

16. Pipe handling apparatus comprising:
pipe holding and supporting means for holding and supporting a first length of piping as said first length of piping is lifted in use toward a second length of piping,
(1) indexing means for pivoting the pipe holding and supporting means,
(2) an angled pivoting beam which is constructed and arranged to be hydraulically actuated via control means in a driver's cab of a control vehicle;
(3) camera means arranged to convey pictures of various parts of the apparatus in relation to pipe work during pipe handling, to an operator and to pick up on pipe alignment means in the form of a laser beam to assist in laying of pipework,
the pipe holding and support apparatus being powered from a hydraulic power source of an excavator vehicle fitted with said apparatus.

17. A vehicle adapted for lifting, laying and joining pipes in end to end relationship, said vehicle having pipe handling and laying apparatus comprising pipe holding and supporting means for holding and supporting a first length of piping as it is lifted from a location remote from a previously laid second length of piping and introduced toward the second length of piping and joined thereto, and axial extendible and retractable grip means connected to said pipe holding and supporting means for gripping an interior of the second length of piping as the first length of piping is moved into correct alignment therewith and joined thereto.

18. A system for handling, laying and joining pipes, said system comprising:
a pipe holding and supporting means for holding and supporting a first length of piping as said first length of piping is lifted from a location remote from a previously laid second length of piping and introduced toward the second length of piping, axially extending and retracting grip means for extending axially within said second length of piping and gripping an interior thereof, and means for relaying information regarding alignment of said two lengths of piping as they are joined together, to an operator remote from said first and second lengths of piping.

* * * * *